No. 794,531.                                           Patented July 11, 1905.

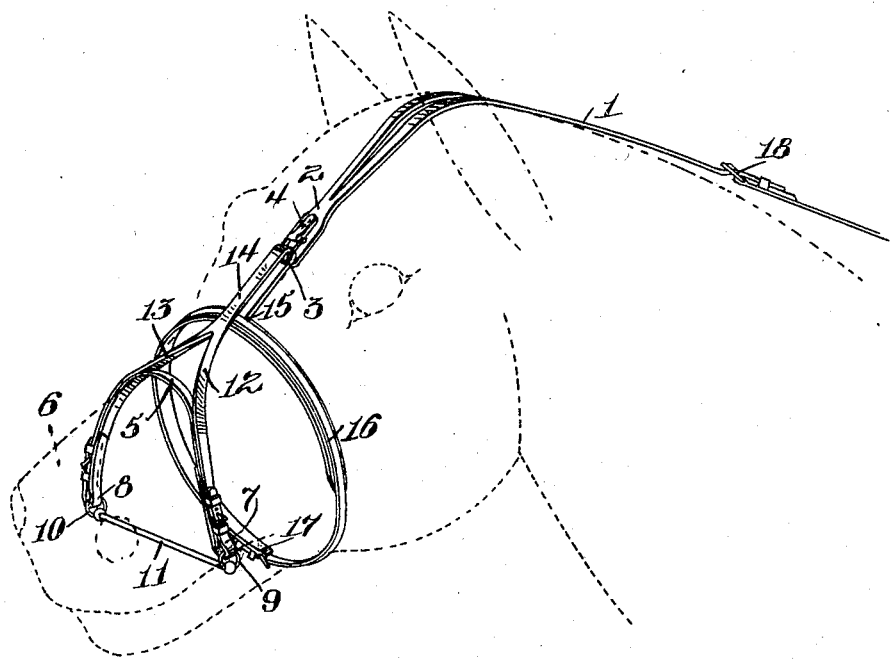

UNITED STATES PATENT OFFICE.

EDWARD MORREY, OF ORANGEBURG, NEW YORK, ASSIGNOR TO WILLIAM H. BROWER, OF TAPPAN, NEW JERSEY.

CHECK-STRAP.

SPECIFICATION forming part of Letters Patent No. 794,531, dated July 11, 1905.

Application filed September 17, 1904. Serial No. 224,843.

*To all whom it may concern:*

Be it known that I, EDWARD MORREY, a citizen of the United States, and a resident of Orangeburg, in the county of Rockland and State of New York, have invented an Improvement in Check-Straps, of which the following is a specification.

This invention has reference to check-straps for animals.

It is an object of the invention to prevent the animal from unnecessarily drawing upon the reins without at the same time causing undue discomfort, to provide a bridle having a forward loop which takes over the nose of the animal and a rearward loop which surrounds the entire face of the animal, and also to provide an inexpensive, durable, and efficient device.

An embodiment of this invention is set forth on the accompanying drawing, which illustrates an application of the device to the head of an animal.

In the form shown the check-strap 1 is provided at its forward extremity 2 with a roller 3, which may be made in any suitable manner and which, if desired, may be made from the frame of a buckle, and this member may be secured to the check-strap 1 by a tab 4. A loop 5, which takes over the upper portion 6 of the face of the animal, has its ends 7 and 8 respectively secured to rings 9 and 10 of a bit 11, and from such loop extend two streamers 12 and 13, respectively, which terminate in a strap 14, which takes around said roller 3 and is secured, as at 15, to a band 16, which passes around the entire face of the animal, said band being provided with an adjustable buckle 17, so that the same may be fitted to suit varying conditions. The check 1 is likewise provided with an adjusting-buckle 18, whereby the length of said strap may be adjusted, so that the proper positioning of the parts heretofore described may be accomplished in order to give the best results.

While it is preferred that the check-strap 1 shall cross the top of the animal's head in a manner as shown and the connection between such strap and the parts be at a point approximately central of the length of the animal's head, such arrangement is not necessarily compulsory, and other arrangements may be properly resorted to within the spirit of this invention. It is thought, however, that such location of parts as is herein shown is conducive to efficiency and operation.

It will now be observed that if it is the habit of the animal to seek to draw more rein, which of course necessitates the drawing forth of the head, that portion of the check-strap which is actuated by the bit in the animal's mouth will cause the band around the face of the animal to be drawn upwardly and rearwardly, whereby a sufficient binding effect is obtained to make it noticeable to the animal, in which event it will cease to further draw on the reins. In this way it is obvious that the habit of drawing for more rein may be successfully overcome by a device simple in construction, automatic in operation, and highly efficient for the purposes for which it is designed.

Having thus described my invention, I claim—

1. A check-strap comprising a loop adapted to pass over the nose of an animal, a band which surrounds the nose and jaw of said animal, a connection between said loop and band, and means whereby said loop and band are drawn away from each other.

2. A check-strap comprising a loop adapted to pass over an animal's nose, a band which surrounds the nose and jaw of said animal, a connection between the two, and a strap provided with means through which said connection travels.

3. A check-strap comprising a loop adapted to pass over an animal's nose, a band surrounding the nose and jaw of said animal, a connection between the two, and a strap provided with a roller around which said connection is drawn.

4. A check-strap for animals comprising a loop which passes over the upper part of the nose and which is connected to a bit, a band which surrounds the nose and jaw and which is connected with said loop, means for holding said loop and band on the face of the animal, said means also providing for the shifting of one member to and fro with relation to the other.

5. A check-strap for animals comprising a loop adapted to pass over the upper part of the nose and which is connected to a bit, an adjustable band which surrounds the nose and jaw, a connection between said loop and band, an adjustable strap, and means carried by said adjustable strap through which said connection moves.

6. A check-strap for animals comprising a member carried by the bit, and which passes over the upper portion of the nose, a member which surrounds the nose and jaw, a connecting member between the two, the member which surrounds the nose and jaw limiting the movement of the first-mentioned member.

EDWARD MORREY.

Witnesses:
GEORGE E. CORWIN,
LOUISE MILLER.